(12) United States Patent
Ishihara et al.

(10) Patent No.: US 7,807,753 B2
(45) Date of Patent: Oct. 5, 2010

(54) COATING COMPOSITION AND MULTILAYERED COATING FILM FORMING METHOD AND COATED ARTICLE USING THIS COATING

(75) Inventors: Tatsuya Ishihara, Machida (JP); Tomoyoshi Saito, Yokohama (JP); Shoichi Yoshinobu, Zama (JP); Tatsuya Suzuki, Isehara (JP); Eitaro Shimotsuma, Hirakata (JP); Hiroaki Kobayashi, Hirakata (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 472 days.

(21) Appl. No.: 11/445,959

(22) Filed: Jun. 1, 2006

(65) Prior Publication Data

US 2006/0292379 A1   Dec. 28, 2006

(30) Foreign Application Priority Data

Jun. 23, 2005   (JP) ............................. 2005-184006

(51) Int. Cl.
   *C08F 8/30* (2006.01)

(52) U.S. Cl. ...................... 525/123; 525/127; 525/418; 525/453; 528/67; 528/85; 528/367

(58) Field of Classification Search .................. 525/127
See application file for complete search history.

(56) References Cited

U.S. PATENT DOCUMENTS

| | | | | |
|---|---|---|---|---|
| 4,188,472 A | * | 2/1980 | Chang | .......................... 528/75 |
| 4,532,300 A | | 7/1985 | Lenz et al. | |
| 4,687,813 A | | 8/1987 | Lenz et al. | |
| 4,758,625 A | * | 7/1988 | Boyack et al. | .............. 525/123 |
| 5,064,695 A | * | 11/1991 | Hotta et al. | .............. 427/407.1 |
| 5,376,720 A | | 12/1994 | Ando | |
| 5,709,950 A | * | 1/1998 | Burgman et al. | ......... 428/423.1 |
| 5,821,315 A | | 10/1998 | Moriya et al. | |
| 6,203,607 B1 | * | 3/2001 | Schoonderwoerd et al. | ..................... 106/287.11 |
| 6,713,551 B2 | * | 3/2004 | Takahashi et al. | ........... 524/500 |
| 2003/0102217 A1 | | 6/2003 | Kasahara et al. | |
| 2003/0171473 A1 | | 9/2003 | Sawada et al. | |
| 2003/0187152 A1 | | 10/2003 | Shimura et al. | |

FOREIGN PATENT DOCUMENTS

| | | |
|---|---|---|
| EP | 0 567 039 A2 | 10/1993 |
| GB | 2 303 632 A | 2/1997 |
| JP | 5-32935 A | 2/1993 |
| JP | 11-228905 A | 8/1999 |
| JP | 2000-297112 A | 10/2000 |
| JP | 2001-11376 A | 1/2001 |
| JP | 2006-8936 A | 1/2006 |

OTHER PUBLICATIONS

Mark, et al. eds. Encyclopedia of Polymer Science and Engineering, 2$^{nd}$ ed., Polyurethanes; vol. 13, p. 258. J. Wiley and Sons: New York, NY. 1985.*

* cited by examiner

*Primary Examiner*—Randy Gulakowski
*Assistant Examiner*—Kyle Baumstein

(57) ABSTRACT

An object of the present invention is to provide a coating composition for forming a coating film having extremely high scratch resistance which could not be achieved up to now, concretely, such a degree of scratch resistance that even if the surface of a coating film is rubbed under strong external force by a cloud of sand flying and others while car washing and running, the surface can endure it. As a means of achieving this object, the coating composition according to the present invention comprises acrylic resin (A) having a short side chain hydroxyl group (a1) and a long side chain hydroxyl group (a2) and polyisocyanate prepolymer (C) as essential components and, as the need arises, further comprises polylactonepolyol (B), wherein the content ratio of the short side chain hydroxyl group (a1) to the long side chain hydroxyl group (a2), the total hydroxyl value of the short side chain hydroxyl group (a1) and the long side chain hydroxyl group (a2), the solid content ratio of the acrylic resin (A) to the polylactonepolyol (B), and the amount of the polyisocyanate prepolymer (C) being combined are in their respective specific ranges.

6 Claims, No Drawings

COATING COMPOSITION AND MULTILAYERED COATING FILM FORMING METHOD AND COATED ARTICLE USING THIS COATING

BACKGROUND OF THE INVENTION

A. Technical Field

The present invention relates to: a coating composition for forming a coating film that can give high scratch resistance to, for example, parts for car exteriors; and a multilayered coating film forming method and a coated article using this coating composition.

B. Background Art

Plastic moldings manufactured from, for example, poly(methyl methacrylate) resin, polymethacrylimide resin, polycarbonate resin, poly(ethylene terephthalate) resin, poly(butylene phthalate) resin, polystyrene resin, AS resin, ABS resin, polyolefin resin and the like are lightweight and good in impact resistance, and widely used as such as plastic materials for cars. However, because the surfaces of these plastic moldings do not have sufficient scratch resistance, these plastic moldings have such faults that: they easily undergo damages on their surfaces by contact and friction with other hard things, scratching, and the like, and the damages done to the surfaces deteriorate their commodity values remarkably, or make their commodities unusable in a short term. Thus, as a means to give scratch resistance to plastic moldings, it is usually carried out to coat the surfaces with a coating to form coating films for enhancing the scratch resistance. Therefore, especially in car uses, the demand of enhancing the scratch resistance of a coating film is high. The demand of enhancing the scratch resistance of a coating film is not limited to plastic materials, but similarly exists also as to the coating film on parts where a metallic material is used, for example, such as bodies.

By the way, a coating film to be formed on a plastic molding is desired to be a coating film that contributes also to the improvement of the capabilities such as weather resistance and stain resistance and must have sufficient adhesion. As a coating film which meets such requirements, a coating film from an isocyanate-curing acrylic polyol coating (an acryl-isocyanate-based coating film) has so far been thought to be suitable in terms of being curable at low temperatures, being excellent in adhesion, being good in various capabilities such as weather resistance and stain resistance, and also being advantageous in the cost. Although the coating film formed for enhancing the scratch resistance of a plastic molding is also desired to be the acryl-isocyanate-based coating film having such advantages as describe above, the acryl-isocyanate-based coating film is generally not high in scratch resistance. Consequently, a technique to enhance the scratch resistance of the acryl-isocyanate-based coating film is demanded.

Thus, as a coating being able to form an acryl-isocyanate-based coating film that has high scratch resistance, so far the following compositions have been proposed: a clear coating composition such that a fluorine-containing copolymer having a hydroxyl value within a specific range, an acrylic copolymer having a hydroxyl value within a specific range, and an isocyanate prepolymer as a curing agent are combined at a specific ratio (see patent document 1); a photocuring resin composition containing an urethane compound having a specific structure, a photopolymerizable acrylic monomer having a specific structure and a photopolymerization initiator (see patent document 2); and the like.

On the other hand, as a means to enhance the scratch resistance by coating other than forming the acryl-isocyanate-based coating film, there have been proposed techniques of attempting to enhance the scratch resistance by introducing a polycaprolactone into a polysiloxane-based coating film and thereby enhancing the elasticity. In concrete terms, the following coating compositions have been proposed: a coating composition containing a polydimethylsiloxane-based copolymer, polycaprolactone and polysiloxane; a coating composition containing a dimethylsiloxane-based copolymer having a backbone into which polycaprolactone and polysiloxane have been introduced; a coating composition containing a polydimethylsiloxane-based copolymer with a backbone into which polycaprolactone has been introduced and further containing polysiloxane; and a coating composition containing a polydimethylsiloxane-based copolymer with a backbone into which polysiloxane has been introduced and further containing polycaprolactone (see patent documents 3 and 4).

[Patent Document 1] JP-A-05-032935 (Kokai)
[Patent Document 2] JP-A-2000-297112 (Kokai)
[Patent Document 3] JP-A-11-228905 (Kokai)
[Patent Document 4] JP-A-2001-011376 (Kokai)

However, though in both the above-mentioned conventional acryl-isocyanate-based coating film and polysiloxane-based coating film, a certain degree of scratch resistance is obtained, yet, for example, in uses of parts for car exteriors and others, when the surface of a coating film is rubbed under strong external force by a cloud of sand flying and others while car washing and running, such problems occurred occasionally that the inside of the coating film went so far as being shaved off in addition to the damage of the surface of the coating film. For details, the coating composition described in the patent document 1 is aimed at increasing the hardness and improving the scratch resistance, as a result, by introducing an acrylic copolymer, and the photocuring resin composition described in the patent document 2 is aimed at increasing the hardness and improving the scratch resistance, as a result, by increasing the crosslinking density through the introduction of a structure for promoting the photopolymerization by ultraviolet irradiation. However, when the crosslinking density is too high, such problems as to decrease adhesion or to induce cracks are caused by the increase of the strain when being cured and shrunk. From such a reason, there is a limit in raising the hardness in any case, and consequently, it was difficult to achieve such a degree of hardness as to be durable (without the inside of the coating film being shaved off) when the surface of the coating film is rubbed under strong external force as described above. Also, the coating compositions described in the patent documents 3 and 4 are aimed at, by the introduction of the polycaprolactone to provide the elasticity, reducing the impact and improving the scratch resistance, as a result, when a cloud of sand and the like contact with the coating film. However, the hardness is insufficient (for example, it is clearly lower even when compared with the acryl-isocyanate-based coating film sufficiently cured). Therefore, when the surface of the coating film was rubbed under such strong external power as described above, still the coating film was occasionally shaved off to the inside.

SUMMARY OF THE INVENTION

A. Object of the Invention

Thus, an object of the present invention is to provide: a coating composition for forming a coating film having extremely high scratch resistance which could not be achieved up to now; and a multilayered coating film forming method and a coated article using this coating composition.

Incidentally, the scratch resistance that the present invention intends to achieve is, concretely, such a degree of scratch resistance that even if the surface of a coating film is rubbed under strong external force by a cloud of sand flying and others while car washing and running, the scratches never go so far as the inside, so the surface can sufficiently endure this strong external force.

B. Disclosure of the Invention

The present inventors have diligently studied to solve the above-mentioned problems. First, as the premise for the studies, as to crosslinked polymer structures to be backbone polymers in cured films, it was decided to use acryl-isocyanate-cured ones having such advantages as being curable at low temperatures, being excellent in adhesion, being good in various capabilities such as weather resistance and stain resistance, and also being advantageous in the cost, and it was thought that in addition to reveal reasonable hardness within the range where the polymer itself could exhibit, insufficient scratch resistance for the polymer itself should be supplemented by other contrivances. As a result, the thinking at that time can be brought together as follows: when scratch resistance is improved about an acryl-isocyanate-based coating film that is excellent in various capabilities as mentioned above, if not depending only on improving hardness as usually but high elasticity is also given to the coating film in addition to enough hardness, the coating film does not repulse at once to the impact such as a cloud of sand which comes into contact violently but flexibly dents once to weaken the impact, and then the dent is restored by excellent restoring power and it comes to return to the original surface state of the coating film, and consequently, the extremely high scratch resistance which could not be achieved up to now will be able to be achieved. And, about concrete means that can give high elasticity in addition to enough hardness, various studies were piled up, so that it has been found that since introducing a long side chain hydroxyl group into a polymer provides this polymer with elasticity, if the above-mentioned acryl-isocyanate-cured crosslinked polymer structure having various merits is used as a backbone polymer in a cured film and, into this backbone polymer, there is introduced the long side chain hydroxyl group, then it becomes possible to make the above-mentioned acryl-isocyanate-cured crosslinked polymer structure exercise the elasticity as well, and further that if a polycaprolactone abundant in elasticity is also introduced as the need arises, then a part exhibiting the elasticity can be lengthened (that is, the part exhibiting the elasticity can be formed into "a long side chain structure+ a polycaprolactone structure+ a long side chain structure") and thereby an extremely excellent elastic force can be produced. On the other hand, it has also been found that the adoption of only the above structure enhances the elasticity, but results in being a little inferior in such as strength, hardness and weather resistance of a coating film being formed, and it has further been found that in order to avoid ending in such results, it will do to further introduce a short side chain hydroxyl group as a side chain. The present invention has been completed on the basis of these findings.

That is, a coating composition according to the present invention comprises acrylic resin (A) and polyisocyanate prepolymer (C) as essential components and optionally further comprises polylactonepolyol (13) in the range where the solid content ratio of the acrylic resin (A) to the polylactonepolyol (B) is (A)/(B)=60/40 to less than 100/0 (mass ratio), wherein: the acrylic resin (A) is a resin having a short side chain hydroxyl group (a1) and a long side chain hydroxyl group (a2) wherein the mutual ratio of the short side chain hydroxyl group (a1) to the long side chain hydroxyl group (a2) is (a1)/(a2)=3/1 to 1/3 (mole ratio) and wherein the total hydroxyl value of the short side chain hydroxyl group (a1) and the long side chain hydroxyl group (a2) is in the range of 100 to 200; and the polyisocyanate prepolymer (C) is combined so that the ratio of the amount of the isocyanate group (c) of the polyisocyanate prepolymer (C) to the total amount of hydroxyl groups of the acrylic resin (A) and the polylactonepolyol (B) (a+b) is (c)/(a+b)=1/0.3 to 1/2.0 (mole ratio).

Incidentally, in the present invention, a side chain of 6 or more in carbon number is defined as a long side chain, and a side chain of less than 6 in carbon number is defined as a short side chain. The number of carbons in the long side chain is preferable to be 15 or more, and the number of carbons in the short side chain is preferable to be 3 or less. Moreover, the long side chain is preferable to contain an ε-lactone ring that is a structure of easily increasing elasticity especially.

A method for forming a multilayered coating film, according to the present invention, is a method for forming a multilayered coating film which comprises the step of forming a clear coating film from a clear coating on a base coating film formed from a base coating, with the method being characterized in that the aforementioned coating composition according to the present invention is used as the clear coating.

A coated article according to the present invention is a coated article which comprises a clear coating film and a base coating film wherein the clear coating film is formed from a clear coating on the base coating film formed from a base coating, with the coated article being characterized in that the aforementioned coating composition according to the present invention is used as the clear coating.

C. Effects of the Invention

The present invention can provide: a coating composition for forming a coating film having extremely high scratch resistance which could not be achieved up to now; and a multilayered coating film forming method and a coated article using this coating composition; wherein the extremely high scratch resistance is, concretely, such a degree of scratch resistance that even if the surface of a coating film is rubbed under strong external force by a cloud of sand flying and others while car washing and running, the surface can endure it.

DETAILED DESCRIPTION OF THE INVENTION

Hereinafter, detailed descriptions are given about the coating composition, the multilayered coating film forming method and the coated article according to the present invention. However, the scope of the present invention is not bound to these descriptions. And other than the following illustrations can also be carried out in the form of appropriate modifications of the following illustrations within the scope not departing from the spirit of the present invention.

[Coating Composition]:

The coating composition of the present invention comprises acrylic resin (A) having a short side chain hydroxyl group (a1) and a long side chain hydroxyl group (a2) and polyisocyanate prepolymer (C) as essential components and, as the need arises, further comprises polylactonepolyol (B). Hereinafter, each of them will be described in detail.

The above-mentioned acrylic resins (A) preferably include, for example, copolymers obtained by copolymerizing the following monomers: (1) ethylenic monomers having a hydroxyl group such as hydroxymethyl (meth)acrylate, hydroxyethyl (meth)acrylate, hydroxypropyl (meth)acrylate, hydroxybutyl (meth)acrylate, and N-methylolacrylamine; (2) ethylenic monomers having a carboxyl group such as (meth) acrylic acid, crotonic acid, itaconic acid, fumaric acid, and maleic acid; (3) ethylenic monomers copolymerizable with the above-mentioned monomers (1) and (2), such as alkyl (meth)acrylates such as methyl (meth)acrylate, ethyl (meth) acrylate, propyl (meth)acrylate, butyl (meth)acrylate, n-propyl (meth)acrylate, n-butyl (meth)acrylate, isobutyl (meth) acrylate, 2-ethylhexyl (meth)acrylate, n-octyl (meth) acrylate, and n-dodecyl (meth)acrylate; and F-caprolactone, (meth)acrylonitrile, styrene, or the like. Acrylic resin (A) may be one kind, or may be two or more kinds.

In the above-mentioned acrylic resin (A), it is preferable in the point of combination of scratch resistance and weather resistance that the above-mentioned short side chain hydroxyl group (a1) is a group derived from hydroxyethyl (meth)acrylate, and the above-mentioned long side chain hydroxyl group (a2) is a group derived from an adduct of hydroxyethyl (meth)acrylate and ε-caprolactone. The acrylic resin (A) having such a short side chain hydroxyl group (a1) and a long side chain hydroxyl group (a2) can be obtained by copolymerizing a monomer component containing the hydroxyethyl (meth)acrylate and the adduct of hydroxyethyl (meth)acrylate and ε-caprolactone.

In the above-mentioned acrylic resin (A), in cases where the above-mentioned long side chain hydroxyl group (a2) is a group derived from the adduct of hydroxyethyl (meth)acrylate and ε-caprolactone, further the above-mentioned adduct of hydroxyethyl (meth)acrylate and ε-caprolactone is, in the point of revealing scratch resistance, preferable to be formed by adding 2 to 5 moles of ε-caprolactones to 1 mole of hydroxyethyl (meth)acrylate.

It is important for the acrylic resin (A) that the content ratio of the short side chain hydroxyl group (a1) to the long side chain hydroxyl group (a2) is (a1)/(a2)=3/1 to 1/3 (mole ratio). It is preferable that the content ratio of the short side chain hydroxyl group (a1) to the long side chain hydroxyl group (a2) is (a1)/(a2)=2/1 to 1/2 (mole ratio). When the content ratio of the long side chain hydroxyl group (a2) is less than the above-mentioned range, the restoring force becomes insufficient and a dent caused by impact cannot be returned to the original surface state of the coating film, and the scratch resistance is consequently lowered. On the other hand, when the content ratio of the long side chain hydroxyl group (a2) is more than the above-mentioned range, the hydrolysis occurs easily and the weather resistance is lowered.

It is important for the acrylic resin (A) that the total hydroxyl value of the short side chain hydroxyl group (a1) and the long side chain hydroxyl group (a2) is in the range of 100 to 200. It is preferable that the total hydroxyl value of the short side chain hydroxyl group (a1) and the long side chain hydroxyl group (a2) is in the range of 120 to 180. When the total hydroxyl value of the short side chain hydroxyl group (a1) and the long side chain hydroxyl group (a2) is less than 100, the photodegradation occurs easily and the weather resistance is consequently lowered. On the other hand, when the total hydroxyl value is over 200, the restoring force becomes insufficient and a dent caused by impact cannot be returned to the original surface state of the coating film, and the scratch resistance is consequently lowered.

The glass transition temperature of the above-mentioned acrylic resin (A) is preferable to be in the range of 5 to 50° C., and more preferable to be in the range of 10 to 40° C. When the glass transition temperature of the acrylic resin (A) is lower than 5° C., there is a tendency such that: the weather resistance is lowered and the stain resistance is also deteriorated. On the other hand, when the glass transition temperature is over 50° C., there is a possibility that: the restoring force may become insufficient and a dent caused by impact cannot be returned to the original surface state of the coating film, and the scratch resistance may be consequently lowered. Incidentally, the above-mentioned glass transition temperature is a value measured when raising the temperature in the 3rd step in a process where: solvents are distilled off under reduced pressure from a resin varnish being obtained in the synthesis of the above-mentioned acrylic resin (A) and containing this acrylic resin (A), and then a differential scanning calorimeter (DSC) (thermal analysis device SSC/5200H, manufactured by Seiko Electronic Industries Corp.) is used to carry out the following three temperature-raising and depressing steps:

1st step: 20° C.→100° C. (temperature-raising speed: 10° C./min);

2nd step: 100° C.→−50° C. (temperature-depressing speed: 10° C./min);

3rd step: −50° C.→100° C. (temperature-raising speed: 10° C./min).

Although the weight average molecular weight of the above-mentioned acrylic resin (A) is not especially limited, it is preferable to be in the range of 6,000 to 20,000.

Although the above-mentioned polylactonepolyol (B) is not especially limited, for example, bifunctional polycaprolactonediols such as compounds shown by the following general formula (1), trifunctional polycaprolactonetriols such as compounds shown by the following general formula (2), and besides, tetrafunctional polycaprolactonepolyols can be cited. Polylactonepolyol (B) may be one kind, or may be two kinds or more.

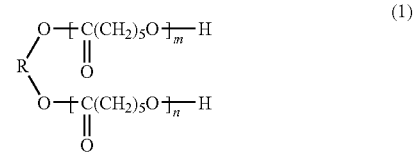

(In the formula (1), R indicates any of $C_2H_4$, $C_2H_4OC_2H_4$, and $C(CH_2)_2(CH_2)_2$, and m and n indicate an integer of 4 to 35, respectively.)

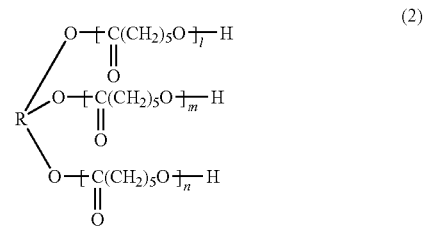

(In the formula (2), R indicates any of $CH_2CHCH_2$, $CH_3C(CH_2)_2$, and $CH_3CH_2C(CH_2)_3$, and $l+m+n$ indicates an integer of 3 to 30.)

The number of functional groups in the above-mentioned polylactonepolyol (B) is preferable to be in the range of 2 to 5, and more preferable to be in the range of 3 to 4. When the number of functional groups in the polylactonepolyol (B) is less than 2 (that is, monofunctional), there is a tendency such that: the weather resistance is lowered and the stain resistance is also deteriorated. On the other hand, when the number of functional groups in the polylactonepolyol (B) is more than 5, there is a possibility that: the restoring force may become insufficient and a dent caused by impact cannot be returned to the original surface state of the coating film, and the scratch resistance may be consequently lowered.

In the coating composition of the present invention, it is important that the solid content ratio of the acrylic resin (A) to the polylactonepolyol (B) is (A)/(B)=60/40 to 100/0 (mass ratio). Though the polylactonepolyol (B) does not have to be included, if, when it is included, its solid content ratio is higher than the above-mentioned ratio of (A)/(B)=60/40, then the hydrolysis occurs easily and the weather resistance is lowered. Therefore, it is important to arrange that the solid content ratio of the polylactonepolyol (B) should not exceed 40 mass % based on the total solid content of the (A) and (B).

Although the above-mentioned polyisocyanate prepolymer (C) is not especially limited, for example, methylene diisocyanate, toluene diisocyanate, hexamethylene diisocyanate, isophorone diisocyanate, and the like are preferably used. Polyisocyanate prepolymer (C) may be one kind, or may be two kinds or more.

In the coating composition of the present invention, it is important that the polyisocyanate prepolymer (C) is combined so that the ratio of the amount of the isocyanate group (c) of the polyisocyanate prepolymer (C) to the total amount of hydroxyl groups of the acrylic resin (A) and the polylactonepolyol (B) (a+b) is (c)/(a+b)=1/0.3 to 1/2.0 (mole ratio), preferably to be (c)/(a+b)=1/0.5 to 1/1.5 (mole ratio). When the amount of the isocyanate group (c) is below the above-mentioned range, the photodegradation occurs easily and the weather resistance is consequently lowered. On the other hand, when the amount of the isocyanate group (c) is over the above-mentioned range, the restoring force becomes insufficient and a dent caused by impact cannot be returned to the original surface state of the coating film, and the scratch resistance is consequently lowered.

Also as to the resin component in the coating composition of the present invention, in its molecular structure there is contained a structural unit —$(CH_2)_n$— referred to commonly as soft segment. However, if the content of this soft segment is too high, there is a possibility that the hardness, weather resistance and chemical resistance of the resultant coating film may be deteriorated. Therefore, the content of the soft segment is favorably lower than 25 mass %, more favorably 20 mass % or lower, relative to the total solid content of the acrylic resin (A) and the polyisocyanate prepolymer (C).

The coating composition of the present invention can, if necessary, be suitably combined with an organic solvent, an ultraviolet absorbent, a light stabilizer, an antioxidant, a yellowing inhibitor, a bluing agent, a pigment, a leveling agent, a defoaming agent, a thickening agent, a sedimentation inhibitor, an antistatic agent, an anticlouding agent, or the like within the range where no effects of the present invention are ruined.

The coating composition of the present invention is preferably used as a clear coating, or its intermediate, which is coated to, for example, parts for car exteriors and others to improve the scratch resistance.

[Method for Forming a Multilayered Coating Film]:

The method for forming a multilayered coating film, according to the present invention, is a method for forming a multilayered coating film which comprises the step of forming a clear coating film from a clear coating on a base coating film formed from a base coating, wherein the aforementioned coating composition according to the present invention is used as the clear coating. In concrete terms, the following methods can be cited, but there is no limitation to these method, that is, for example, i) a method in which (if necessary, after performing the surface treatment, the electrodeposition coating film formation, the intermediate coat coating film formation, and the like) on a metal base material, there is formed a base coating film as a top coating from a base coating, and thereon there is coated a clear coating comprising the coating composition of the present invention to form a coating film (and curing it); and ii) a method in which (if necessary, after performing the heat treatment (annealing) for removing a strain when shaping a base material, the primer coating film formation, and the like) on a plastic base material, there is formed a base coating film as a top coating from a base coating, and thereon there is coated a clear coating comprising the coating composition of the present invention to form a coating film (and curing it).

The base coating usable in the method for forming a multilayered coating film of the present invention is not especially limited. However, for example, solvent type coatings such as lacquer type coatings, acryl-melamine baking type coatings, and two-component curing type urethane coatings, and aqueous coatings, and the like can be preferably used.

In the method for forming a multilayered coating film of the present invention, conventional publicly known coating film formation methods are applicable without limitation except for using the coating composition of the present invention as a clear coating.

In the method for forming a multilayered coating film of the present invention, the method for coating the base coating or clear coating is not especially limited. For example, publicly known coating methods such as the spray coating, the dip coating, the shower coat coating, the roll coater coating, and the rotating bell coating may be adopted. Incidentally, in the cases of the spray coating and the rotating bell coating, they may be electrostatic coating. Although the film thickness in the coating step may be properly set, for example, the base coating is usually coated so that the dry film thickness may be in the range of 10 to 20 μm, and the clear coating is usually coated so that the dry film thickness may be in the range of 20 to 40 μm.

In the method for forming a multilayered coating film of the present invention, the formation of the base coating film and the clear coating film may be carried out as follows: after each coating is applied, the coating is dried to form a coating film in a usual manner, respectively. The method for drying to form a coating film is not especially limited, but examples thereof include drying at normal temperature, forced drying, curing at normal temperature, baking curing, and photocuring by ultraviolet irradiation. Drying to form a coating film may be carried out every coating film after coating with each coating, or may be carried out all at once after all coatings are coated in wet-on-wet.

[Coated Article]:

The coated article according to the present invention is a coated article which comprises a clear coating film and a base coating film wherein the clear coating film is formed from a clear coating on the base coating film formed from a base coating, with the coated article being characterized in that the aforementioned coating composition according to the present invention is used as the clear coating. Such a coated article of the present invention has extremely high scratch resistance which could not be achieved up to now, concretely, such a degree of scratch resistance that even if the surface of a coating film is rubbed under strong external force by a cloud of sand flying and others while car washing and running, the surface can endure it. The coated article of the present invention can be obtained easily, for example, by the above-mentioned present invention method for forming a multilayered coating film.

DETAILED DESCRIPTION OF THE PREFERRED EMBODIMENTS

Hereinafter, the present invention is more specifically illustrated by the following Examples of some preferred embodiments. However, the present invention is not limited to these. Hereinafter, unless otherwise noted, the units "mass part(s)" and "mass %" are referred to simply as "part(s)" and "%" respectively.

[Manufacturing Examples of Resins]:

—Manufacture of Acrylic Polyol Resin A1—

In a reaction vessel equipped with a stirrer, a thermometer, a reflux pipe, dropping funnels, a nitrogen gas introduction pipe, and a heating apparatus with a thermostat, 30 parts of the mixed solvent (So) in which the mass ratio of butyl acetate to xylene was 1:3 was fed and was heated until the internal temperature of the mixed solvent reached 120° C. while stirring. Next, a monomer mixed solution that was comprised of 21.58 parts of 2-hydroxyethyl methacrylate (HEMA) as a hydroxyl group short chain monomer, 39.53 parts of PLAC-CEL FM3 (manufactured by Daicel Chemical Industries, Ltd.) having three ε-caprolactone groups as a hydroxyl group long chain monomer, 24.5 parts of isoboronyl methacrylate (IBX), 12.85 parts of n-butyl methacrylate (nBMA), and 1.53 parts of methacrylic acid (MAA), and a polymerization initiator solution that was comprised of 6 parts of a peroxide polymerization initiator "Kayaester O (manufactured by Nippon Kayaku Co., Ltd.)" and 32 parts of the above-mentioned mixed solvent (So), were put in different dropping funnels, respectively, and were dropped into the reaction vessel while stirring for three hours, respectively, and polymerized. During the reaction, the solution in the reaction vessel was continuously stirred and the liquid temperature was kept at 120° C. Next, another polymerization initiator solution that was comprised of 0.5 parts of the above-mentioned peroxide polymerization initiator "Kayaester O" and 9 parts of the above-mentioned mixed solvent (So) was dropped into the reaction vessel being kept at 120° C. in liquid temperature while stirring for one hour. The manufacture of acrylic polyol resin A1 was thus ended.

The properties of the resin A1 were as follows: the mole ratio of the short chain hydroxyl group/the long chain hydroxyl group was 2/1, the calculated OH value (OHV) was 140, the observed glass transition temperature (Tg) was 20° C., the weight average molecular weight by the gel permeation chromatography (GPC) measurement was 12,000, and the resinous solid content (NV) was 60%.

—Manufacture of Acrylic Polyol Resins A2 to A12—

Acrylic polyol resins A2 to A12 were manufactured according to the compositions shown in Table 1 by the use of the same procedure as that for manufacturing the resin A1. The properties of the resins A2 to A12 are shown together with the properties of the resin A1 in the item of acrylic polyol in Table 3 below. As for the weight average molecular weight and the resinous solid content (NV), all of the resins A2 to A12 were the same as the resin A1 such that the weight average molecular weight was 12,000 and the resinous solid content (NV) was 60%.

Incidentally, the compound of the trade name "PLACCEL" used for manufacturing the above-mentioned twelve resins is a product of Daicel Chemical Industries, Ltd. and a hydroxyl-group-containing monomer formed by addition of an ε-lactone group to 2-hydroxyethyl methacrylate. Figures in the product numbers FM1, FM2, FM3, and FM5 indicate the numbers of added ε-lactone groups being 1, 2, 3, and 5 respectively.

TABLE 1

|  |  | Resin number | | | | | |
| --- | --- | --- | --- | --- | --- | --- | --- |
|  |  | A1 | A2 | A3 | A4 | A5 | A6 |
| Reaction vessel | Xylene/Butyl acetate | 30 | 30 | 30 | 30 | 30 | 30 |
| Monomer mixed solution | HEMA (Short chain OH) | 21.58 | 24.36 | 13.92 | 16.94 | 26.22 | 21.58 |
| (Dropping 1) | FM3 (Long chain OH) | 39.53 | 29.45 | 50.48 | 31.13 | 47.95 |  |
|  | FM1 (Medium chain OH) |  |  |  |  |  |  |
|  | FM2 (Medium long chain OH) |  |  |  |  |  | 29.99 |
|  | FM5 (Super long chain OH) |  |  |  |  |  |  |
|  | IBX (High Tg) | 24.5 | 14.5 | 34.07 | 18.88 | 24.3 | 11.05 |
|  | nBMA (Low Tg) | 12.85 | 30.16 | 0 | 31.52 | 0 | 35.85 |
|  | MAA (COOH) | 1.53 | 1.53 | 1.53 | 1.53 | 1.53 | 1.53 |
| Polymerization initiator solution | Kayaester O (Initiator) | 6 | 6 | 6 | 6 | 6 | 6 |
| (Dropping 2) | Xylene/Butyl acetate | 32 | 32 | 32 | 32 | 32 | 32 |
| Polymerization initiator solution | Kayaester O (Later shot) | 0.5 | 0.5 | 0.5 | 0.5 | 0.5 | 0.5 |
| (Dropping 3) | Xylene/Butyl acetate | 9 | 9 | 9 | 9 | 9 | 9 |

|  |  | Resin number | | | | | |
| --- | --- | --- | --- | --- | --- | --- | --- |
|  |  | A7 | A8 | A9 | A10 | A11 | A12 |
| Reaction vessel | Xylene/Butyl acetate | 30 | 30 | 30 | 30 | 30 | 30 |
| Monomer mixed solution | HEMA (Short chain OH) | 24.37 | 21.58 | 24.36 | 25.98 | 12.3 | 21.57 |
| (Dropping 1) | FM3 (Long chain OH) |  | 39.53 |  | 23.57 | 22.7 | 20.45 |
|  | FM1 (Medium chain OH) |  |  | 29.45 |  |  |  |
|  | FM2 (Medium long chain OH) |  |  |  |  |  |  |
|  | FM5 (Super long chain OH) | 43.62 |  |  |  |  |  |
|  | IBX (High Tg) | 30.47 | 11.56 | 44.65 | 8.65 | 13.24 | 0 |
|  | nBMA (Low Tg) | 0 | 25.8 | 0 | 40.26 | 50.22 | 56.45 |
|  | MAA (COOH) | 1.53 | 1.53 | 1.53 | 1.53 | 1.53 | 1.53 |

TABLE 1-continued

| | | | | | | | |
|---|---|---|---|---|---|---|---|
| Polymerization initiator solution (Dropping 2) | Kayaester O (Initiator) | 6 | 6 | 6 | 6 | 6 | 6 |
| | Xylene/Butyl acetate | 32 | 32 | 32 | 32 | 32 | 32 |
| Polymerization initiator solution (Dropping 3) | Kayaester O (Later shot) | 0.5 | 0.5 | 0.5 | 0.5 | 0.5 | 0.5 |
| | Xylene/Butyl acetate | 9 | 9 | 9 | 10 | 10 | 10 |

[Manufacturing Examples of Clear Coating Compositions]:

—Coating Composition for Example 1—

In a reaction vessel with a stirrer, 125 parts of the acrylic polyol resin (A1), 25 parts of polycaprolactone "PLACCEL 308" (B1; the solid content is 100% and the number of functional groups is 3, manufactured by Daicel Chemical Industries, Ltd.), and 70 parts of isocyanurate compound "DURANATE THA100 (C1; the solid content is 75%, manufactured by Asahi Kasei Corporation)" as a curing agent were sequentially fed while stirring and sufficiently mixed, and then 50 parts of an additive solution (D) that was comprised of 2 parts of "TINUVIN 900" (ultraviolet absorbent; manufactured by Ciba Specialty Chemicals), 1 part of "TINUVIN 292" (antiphotooxidant; manufactured by Ciba Specialty Chemicals), 1 part of "BYK306" (surface conditioner; manufactured by BYK-Chemie), and 96 parts of the mixed solvent of xylene/butyl acetate=50/50 ($S_1$) was additionally fed in the reaction vessel and sufficiently stirred to manufacture a clear coating composition, which was used in Example 1.

—Coating Compositions for Examples 2 to 17 and Comparative Examples 1 to 5—

According to the resin compositions shown in Table 3, clear coating compositions for Examples 2 to 17 and clear coating compositions for Comparative Examples 1 to 5 were manufactured in the same way as mentioned above.

Incidentally, as to polycaprolactones B2 and B3 and biuret type isocyanate compounds C2 that were used in the above-mentioned Examples and Comparative Examples, their respective details, names of manufacturers', and trade names are as follows:

Polycaprolactone B2; the trade name is "PLACCEL 208", the solid content is 100%, the number of functional groups is 2, manufactured by Daicel Chemical Industries Co., Ltd.

Polycaprolactone B3; the trade name is "PLACCEL 408", the solid content is 100%, the number of functional groups is 4, manufactured by Daicel Chemical Industries Co., Ltd.

Biuret type isocyanate compound C2; "DURANATE 24A-100", the solid content is 75%, manufactured by Asahi Kasei Corporation. Incidentally, as to the commercial form, both of isocyanate type isocyanate compound C1 and this biuret type isocyanate compound C2 are in the form of a solution where 25 parts of the mixed solution of xylene/butyl acetate=50/50 was added to 75 parts of each of these isocyanate compounds.

In each of the above clear coating compositions, the content of the soft segment in the resin component is as shown in Table 2 below.

TABLE 2

| | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Acrylic polyol (NV = 60%) | A1 | A2 | A3 | A4 | A5 | A6 | A7 | A8 | A1 | A8 | A9 |
| Solid content | 75 | 75 | 75 | 75 | 75 | 75 | 75 | 65 | 85 | 75 | 75 |
| Combining amount | 125 | 125 | 125 | 125 | 125 | 125 | 125 | 108 | 142 | 125 | 125 |
| Amount of soft segment | 13.4 | 9.5 | 17.1 | 10.5 | 16.2 | 9.2 | 16.7 | 11.6 | 15.1 | 13.4 | 6.78 |
| Isocyanate (NV = 75%) | C1 | C1 | C1 | C1 | C1 | C1 | C1 | C1 | C1 | C1 | C1 |
| Solid content | 53 | 53 | 53 | 45 | 60 | 53 | 53 | 55 | 51 | 53 | 53 |
| Combining amount | 70 | 70 | 70 | 60 | 80 | 70 | 70 | 73 | 68 | 70 | 70 |
| Amount of soft segment | 13.4 | 9.5 | 17.1 | 10.5 | 16.2 | 9.2 | 16.7 | 11.6 | 15.1 | 13.4 | 6.78 |
| Solid content of acryl + isocyanate in clear coating | 128 | 128 | 128 | 120 | 135 | 128 | 128 | 120 | 136 | 128 | 128 |
| Amount of soft segment/amount of Ac, NCO | 10.5% | 7.4% | 13.4% | 8.8% | 12.0% | 7.2% | 13.0% | 9.7% | 11.1% | 10.5% | 5.3% |
| Polycaprolactone | | | | | | Calculation is unnecessary. | | | | | |

| | Example 12 | Example 13 | Example 14 | Example 15 | Example 16 | Example 17 | Comparative Example 1 | Comparative Example 2 | Comparative Example 3 | Comparative Example 4 | Comparative Example 5 |
|---|---|---|---|---|---|---|---|---|---|---|---|
| Acrylic polyol (NV = 60%) | A1 | A1 | A1 | A1 | A1 | A1 | A10 | A11 | A12 | A1 | A1 |
| Solid content | 75 | 75 | 75 | 75 | 75 | 100 | 75 | 75 | 75 | 65 | 75 |
| Combining amount | 125 | 125 | 125 | 125 | 125 | 168 | 125 | 125 | 125 | 108 | 125 |
| Amount of soft segment | 13.4 | 13.4 | 13.4 | 13.4 | 13.4 | 17.8 | 8.0 | 7.7 | 6.9 | 11.6 | 13.4 |
| Isocyanate (NV = 75%) | C1 | C1 | C1 | C1 | C1 | C1 | C1 | C1 | C1 | C1 | C1 |
| Solid content | 61 | 48 | 53 | 27 | 80 | 49 | 53 | 38 | 53 | 57 | 18 |
| Combining amount | 82 | 64 | 70 | 35 | 105 | 65 | 70 | 50 | 70 | 76 | 23 |
| Amount of soft segment | 13.4 | 13.4 | 13.4 | 13.4 | 13.4 | 17.8 | 8.0 | 7.7 | 6.9 | 11.6 | 13.4 |
| Solid content of acryl + isocyanate in clear coating | 136 | 123 | 128 | 102 | 155 | 149 | 128 | 113 | 128 | 122 | 93 |
| Amount of soft segment/amount of Ac, NCO | 9.9% | 10.9% | 10.5% | 13.1% | 8.6% | 11.9% | 6.3% | 6.8% | 5.4% | 9.5% | 14.4% |
| Polycaprolactone | | | | | | Calculation is unnecessary. | | | | | |

[Examples of Formation of Multilayered Coating Films]:

—Coating to Plastic Materials—<Examples 1 to 13, Examples 15 to 17, Comparative Examples 1 to 5>:

Each of the clear coating compositions, obtained in the above-mentioned manufacturing examples, was beforehand diluted with the above-mentioned mixed solvent (So) in the ratio of 40 parts of the mixed solvent (So) to 100 parts of each clear coating composition.

Commercially available polypropylene materials (70 mm×150 mm×3 mm; NB42 manufactured by Topula Sangyo Co., Ltd.) were coated with "RB111CD Primer" manufactured by Nippon Bee Chemical Co., Ltd. as a primer using a spray gun ("W-71" manufactured by Anest Iwata Corporation) so that the dry film thickness would be 10 μm. After leaving the coated materials for one minute at room temperature, a base coating ("R305D Black" manufactured by Nippon Bee Chemical Co., Ltd.) was coated using the above-mentioned spray gun so that the dry film thickness would be 15 μm, and the coated materials were left for one minute at room temperature, and thereafter immediately each of them was coated with each of the above-mentioned diluted clear coating compositions using the above-mentioned spray gun so that the dry film thickness would be 30 μm in all examples. After leaving the coated materials for 10 minutes at room temperature, the coated materials were dried and cured under an atmosphere of a temperature of 120° C. using a drying machine for 20 minutes, so that coated articles (multilayered coating film test pieces) of the plastic materials were obtained.

About each of the coated articles, the results of evaluation by the evaluation methods described later were as shown in Table 3.

—Coating to Metal Material—<Example 14>:

After an intermediate coat coating (OP2 intermediate coat; Nippon Paint Co., Ltd.) was coated onto an electrodeposition-coated steel sheet (manufactured by Nippon Route Service Co., Ltd.) using the above-mentioned spray gun so that the dry film thickness would be 30 μm, the coated steel sheet was left at room temperature for one minute and then dried and cured under an atmosphere of a temperature of 140° C. using a drying machine for 20 minutes. The coated material was taken out and left at room temperature. Next, thereto a base coating ("AR2200 Black Aqueous Base"; Nippon Paint Co., Ltd.) was coated using the above-mentioned spray gun so that the dry film thickness would be 15 μm, and then dried using a drying machine of 80° C. in atmosphere temperature for four minutes. Then, the coated material was taken out and cooled to room temperature. After that, 100 parts by mass of the clear coating composition of the present invention was diluted with 40 parts by mass of the above-mentioned mixed solvent (So) and then coated using the above-mentioned spray gun so that the dry film thickness would be 30 μm, and then left at room temperature for 10 minutes. Then, the coated material was dried and cured in a drying machine of 140° C. in atmosphere temperature for 20 minutes, so that a coated article, and its test piece, of the iron material were obtained.

About this coated article, the results of evaluation by the evaluation methods described later were as shown in Table 3.

TABLE 3

|  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Acrylic polyol | A1 | A2 | A3 | A4 | A5 | A6 | A7 | A1 | A1 | A8 | A9 |
| Short chain/Long chain | 2/1 | 3/1 | 1/1 | 2/1 | 2/1 | 2/1 | 3/1 | 2/1 | 2/1 | 2/1 | 3/1 |
| Length of long chain | 3 | 3 | 3 | 3 | 2 | 5 | 3 | 3 | 3 | 3 | 3 |
| OHV | 140 | 140 | 120 | 110 | 170 | 140 | 140 | 140 | 140 | 140 | 140 |
| Tg | 20° C. | 20° C. | 18° C. | 20° C. | 15° C. | 20° C. | 16° C. | 20° C. | 20° C. | 10° C. | 46° C. |
| Amount of NV | 75 | 75 | 75 | 75 | 75 | 75 | 75 | 65 | 85 | 75 | 75 |
| Combining amount | 125 | 125 | 125 | 125 | 125 | 125 | 125 | 108 | 142 | 125 | 125 |
| Polycaprolactone | B1 | B1 | B1 | B1 | B1 | B1 | B1 | B1 | B1 | B1 | B1 |
| Number of functional groups | 3 | 3 | 3 | 3 | 3 | 3 | 3 | 3 | 3 | 3 | 3 |
| Ratio of acryl/polycaprolactone | 75/25 | 75/25 | 75/25 | 75/25 | 75/25 | 75/25 | 75/25 | 65/35 | 85/15 | 75/25 | 75/25 |
| Amount of NV | 25 | 25 | 25 | 25 | 25 | 25 | 25 | 35 | 15 | 25 | 25 |
| Combining amount | 25 | 25 | 25 | 25 | 25 | 25 | 25 | 35 | 15 | 25 | 25 |
| Isocyanate "DURANATE THA100" | C1 | C1 | C1 | C1 | C1 | C1 | C1 | C1 | C1 | C1 | C1 |
| Nurate type/Biuret type | Nurate | Nurate | Nurate | Nurate | Nurate | Nurate | Nurate | Nurate | Nurate | Nurate | Nurate |
| OH/NCO equivalent ratio | 1/1 | 1/1 | 1/1 | 1/1 | 1/1 | 1/1 | 1/1 | 1/1 | 1/1 | 1/1 | 1/1 |
| Amount of NV | 53 | 53 | 53 | 45 | 60 | 53 | 53 | 55 | 51 | 53 | 53 |
| Combining amount | 70 | 70 | 70 | 60 | 80 | 70 | 70 | 73 | 68 | 70 | 70 |
| Coating Total amount of NV | 153 | 153 | 153 | 145 | 160 | 153 | 153 | 155 | 151 | 153 | 153 |
| Total combining amount of resins | 220 | 220 | 220 | 210 | 230 | 220 | 220 | 216 | 225 | 220 | 220 |
| Scratch resistance | ◯ | ◯ | ◯ | ◯ | ◯ | ◯ | ◯ | ◯ | ◯ | ◯ | ◯ |
| Weather resistance | ◯ | ◯ | ◯ | ◯ | ◯ | ◯ | ◯ | ◯ | ◯ | ◯ | ◯ |
| Adhesion | ◯ | ◯ | ◯ | ◯ | ◯ | ◯ | ◯ | ◯ | ◯ | ◯ | ◯ |

|  | Example 12 | Example 13 | Example 14 | Example 15 | Example 16 | Example 17 | Comparative Example 1 | Comparative Example 2 | Comparative Example 3 | Comparative Example 4 | Comparative Example 5 |
|---|---|---|---|---|---|---|---|---|---|---|---|
| Acrylic polyol | A1 | A1 | A1 | A1 | A1 | A1 | A10 | A11 | A12 | A1 | A1 |
| Short chain/Long chain | 2/1 | 2/1 | 2/1 | 2/1 | 2/1 | 2/1 | 4/1 | 2/1 | 2/1 | 2/1 | 2/1 |
| Length of long chain | 3 | 3 | 3 | 3 | 3 | 3 | 3 | 3 | 1 | 3 | 3 |
| OHV | 140 | 140 | 140 | 140 | 140 | 140 | 140 | 140 | 140 | 140 | 140 |
| Tg | 20° C. | 20° C. | 20° C. | 20° C. | 20° C. | 20° C. | 20° C. | 20° C. | 22° C. | 20° C. | 20° C. |
| Amount of NV | 75 | 75 | 75 | 75 | 75 | 100 | 75 | 75 | 75 | 65 | 75 |
| Combining amount | 125 | 125 | 125 | 125 | 125 | 168 | 125 | 125 | 125 | 108 | 125 |
| Polycaprolactone | B2 | B3 | B1 | B1 | B1 | — | B1 | B1 | B1 | B1 | B1 |
| Number of functional groups | 2 | 4 | 3 | 3 | 3 | — | 3 | 3 | 3 | 3 | 3 |
| Ratio of acryl/polycaprolactone | 75/25 | 75/25 | 75/25 | 75/25 | 75/25 | 100/0 | 75/25 | 75/25 | 75/25 | 55/45 | 75/25 |

TABLE 3-continued

| Amount of NV | | 25 | 25 | 25 | 25 | 25 | — | 25 | 25 | 25 | 35 | 25 |
|---|---|---|---|---|---|---|---|---|---|---|---|---|
| Combining amount | | 25 | 25 | 25 | 25 | 25 | — | 25 | 25 | 25 | 35 | 25 |
| Isocyanate "DURANATE THA100" | | C1 | C1 | C2 | C1 | C1 | C1 | C1 | C1 | C1 | C1 | C1 |
| Nurate type/Biuret type | | Nurate | Nurate | Biuret | Nurate | Nurate | Nurate | Nurate | Nurate | Nurate | Nurate | Nurate |
| OH/NCO equivalent ratio | | 1/1 | 1/1 | 1/1 | 1/0.5 | 1/1.5 | 1/1 | 1/1 | 1/1 | 1/1 | 1/1 | 1/0.3 |
| Amount of NV | | 61 | 48 | 53 | 27 | 80 | 49 | 53 | 38 | 53 | 57 | 18 |
| Combining amount | | 82 | 64 | 70 | 35 | 105 | 65 | 70 | 50 | 70 | 76 | 23 |
| Coating | Total amount of NV | 161 | 148 | 153 | 127 | 180 | 149 | 153 | 138 | 153 | 157 | 118 |
| | Total combining amount of resins | 232 | 214 | 220 | 185 | 255 | 233 | 220 | 200 | 220 | 219 | 173 |
| | Scratch resistance | ○ | ○ | ○ | ○ | ○ | ○ | X | ○ | X | ○ | ○ |
| | Weather resistance | ○ | ○ | ○ | ○ | ○ | ○ | ○ | X | ○ | X | X |
| | Adhesion | ○ | ○ | ○ | ○ | ○ | ○ | ○ | ○ | ○ | ○ | ○ |

<Evaluation Method of Scratch Resistance>:

About the multilayered coating film test pieces of the plastic materials and the multilayered coating film test piece of the iron material that were manufactured above, the lightness of the surface of each clear film was measured with a deformation color difference meter (manufactured by SUGA TEST INSTRUMENTS CO., LTD.) to determine $L_0$. In this measurement of lightness, the incident light was kept perpendicular to the surface of the clear film to be measured, and the receiving angle of the reflected light was inclined by 10 degrees from the incident light. Onto the clear film side of each test piece, 0.5 cc of dust water for testing (20% aqueous solution prescribed in JIS Z8901) was dropped using a pipette, and then the dust water was spread over the entire surface of the clear film of the test piece using a brush (coating of dust water). Then, after the coating of dust water, each test piece was put on a horizontal table of a mini car washing machine (manufactured by Nippon Paint Co., Ltd.) with the clear film upward, and then water was allowed to flow into the mini car washing machine at the flow rate of 4 liters/minute. After the rotating speed of the mini car washing machine was set to be 150 rpm, the mini car washing machine was operated for ten seconds to wash the surface (clear film surface) of each test piece. The coating of dust water for the test and the washing with the mini car washing machine were taken as one cycle. After 5 cycles were carried out, the surface of the test piece was lightly wiped with absorbent cotton containing isopropyl alcohol. Then, after being left for one hour, the lightness ($L_1$) of the clear film surface was measured with the same color difference meter as used in the measurement of $L_0$, and the difference between the measured lightness and the above-mentioned lightness $L_0$ before testing ($\Delta L_1 = L_0 - L_1$) was calculated. Based on this difference, the scratch resistance was evaluated on the following criteria ○: $\Delta L_1 = 5$ or less X: $\Delta L_1 = 6$ or more <Evaluation Method of Weather Resistance>:

Each test piece was exposed to a xenon weather meter according to JIS K5600-7-7 for 1000 hours. Thereafter, the outer appearance of the clear coating film surface was visually observed and evaluated on the following criteria ○: No water stain was observed.

X: Water stain was observed even slightly.

<Evaluation Method of Adhesion>:

Incisions going so far as reaching the base material were made at intervals of 2 mm in the form of checker board squares in the clear coating film of each test piece to form 100 squares. Then, a pressure sensitive adhesive tape was stuck thereon and thereafter peeled off at a breath. And the peeled state of the coating film was observed with a magnifying glass (10 magnification). The result was evaluated on the following criteria.

○: No peeling is observed.

Δ: Peeling is slightly seen along incisions in the form of checker board squares.

X: Peeling of one or more squares is seen.

INDUSTRIAL APPLICATION

The coating composition according to the present invention can form a coating film having extremely high scratch resistance which could not be achieved up to now, concretely, such a degree of scratch resistance that even if the surface of a coating film is rubbed under strong external force by a cloud of sand flying and others while car washing and running, the surface can endure it. This coating composition, for example, can be suitably applied to moldings which easily undergo damages on their surfaces, such as plastic materials for car exteriors.

What is claimed is:

1. A coating composition, consisting essentially of an acrylic resin (A), a polylactonepolyol (B), and a polyisocyanate prepolymer (C) in the range where the solid content ratio of the acrylic resin (A) to the polylactonepolyol (B) is (A)/(B)=60/40 to less than 100/0 (mass ratio), wherein:
the acrylic resin (A) is a resin having a short side chain hydroxyl group (a1) which is a group derived from hydroxyethyl (meth)acrylate and a long side chain hydroxyl group (a2) which is a group derived from an adduct of hydroxyethyl (meth)acrylate and ε-caprolactone, wherein the mutual ratio of the short side chain hydroxyl group (a1) to the long side chain hydroxyl group (a2) is (a1)/(a2)=3/1 to 1/3 (mole ratio) and wherein the total hydroxyl value of the short side chain hydroxyl group (a1) and the long side chain hydroxyl group (a2) is in the range of 100 to 200; and
the polyisocyanate prepolymer (C) is combined so that the ratio of the amount of the isocyanate group (c) of the polyisocyanate prepolymer (C) to the total amount of hydroxyl groups of the acrylic resin (A) and the polylactonepolyol (B) (a+b) is (c)/(a+b)=1/0.3 to 1/2.0 (mole ratio).

2. The coating composition according to claim 1, wherein the adduct of hydroxyethyl (meth)acrylate and ε-caprolactone is formed by adding 2 to 5 moles of ε-caprolactone to 1 mole of hydroxyethyl (meth)acrylate.

3. The coating composition according to claim 1, wherein the acrylic resin (A) is in the range of 5 to 50° C. in glass transition temperature.

4. The coating composition according to claim 1, wherein the polylactonepolyol (B) has 2 to 5 functional groups.

5. A method for forming a multilayered coating film, which comprises the step of forming a clear coating film from a clear coating on a base coating film formed from a base coating, wherein the coating composition as recited in claim 1 is used as the clear coating.

6. A coated article, which comprises a clear coating film and a base coating film wherein the clear coating film is formed from a clear coating on the base coating film formed from a base coating, wherein the coating composition as recited in claim 1 is used as the clear coating.

* * * * *